United States Patent [19]
Patel et al.

[11] Patent Number: 5,031,135
[45] Date of Patent: Jul. 9, 1991

[54] DEVICE FOR MULTI-PRECISION AND BLOCK ARITHMETIC SUPPORT IN DIGITAL PROCESSORS

[75] Inventors: Chandravadan Patel, Los Altos; Richard W. Blasco, Auburn, both of Calif.; Atsushi Kiuchi; Hiromitsu Inada, both of Tokyo, Japan

[73] Assignee: Hitachi Micro Systems, Inc., San Jose, Calif.

[21] Appl. No.: 354,478

[22] Filed: May 19, 1989

[51] Int. Cl.[5] ............................................. G06F 7/38
[52] U.S. Cl. .................................................. 364/745
[58] Field of Search ............... 364/745, 748, 200, 900, 364/736

[56] References Cited
U.S. PATENT DOCUMENTS 4,538,239 8/1985 Magar ................................. 364/759
4,700,324 10/1987 Doi et al. ............................ 364/745
4,722,068 1/1988 Kuroda et al. ................... 364/745 X
4,811,268 3/1989 Nishitani et al. .................... 364/745
4,817,047 3/1989 Nishitani et al. ............... 364/745 X Primary Examiner—Gary V. Harkcom
Assistant Examiner—Tan V. Mai
Attorney, Agent, or Firm—Koda and Androlia

[57] ABSTRACT

A device for multi-precision and block arithmetic support in a digital processor including a multiplier for multiplying two signed, unsigned or signed and unsigned binary numbers and having a dynamic range greater than −1 to +1, an arithmetic and logic unit for performing arithmetic and logic operations, a barrel shifter for barrel shifting at least one binary number, shifters for selectively shifting the output of the multiplier and multiplexers for selecting and interconnecting the outputs and inputs of the multiplier, the arithmetic and logic unit, the barrel shifter and the shifters.

7 Claims, 8 Drawing Sheets

$x = [x(DV) : x(EX) : x(15:0)]$

| | DIGIT VALUE | $1-2^{-15} \geq x \geq 0$ | $-2^{-15} \geq x \geq -1$ | $2-2^{-15} \geq x \geq 1$ | $-(1+2^{-15}) \geq x \geq -2$ | $x < -2$ | $x \geq 2$ |
|---|---|---|---|---|---|---|---|
| x(0) | $2^{-15}$ | x | x | x | x | x | x |
| x(1) | $2^{-14}$ | x | x | x | x | x | x |
| ⋮ | ⋮ | | | | | | |
| x(13) | $2^{-2}$ | x | x | x | x | x | x |
| x(14) | $2^{-1}$ | x | x | x | x | x | x |
| • | | | | | | | |
| x(15) | $2^{0}$ | 0 | 1 | 1 | 0 | x | x |
| x(EX) | $-2^{1}$ | 0 | 1 | 0 | 1 | 0 | 1 |
| x(DV) | | 0 | 0 | 0 | 0 | 1 | 1 |

FIG. 3

1) IF BOTH OPERANDS HAVE X(DV) = 0 AND SHIFT LEFT = 0

| | P(DV) | P(EX) | P(31) | P(30) | P(29) | --- | P(1) | P(0) | P(-1) | X |
|---|---|---|---|---|---|---|---|---|---|---|
| | | $-2^1$ | $2^0$ | $2^{-1}$ | $2^{-2}$ | | $2^{-30}$ | $2^{-31}$ | $2^{-32}$ | DIGIT VALUE |
| SIGN × SIGN | x | x | x | x | x | | x | x | N.A. | x |
| SIGN × UNSIGN | 0 | x | x | x | x | | x | x | N.A. | x |
| UNSIGN × UNSIGN | 0 | 0 | 0 | x | x | | x | x | x | x |

FIG. 5

II) IF BOTH OPERANDS HAVE X(DV) = 0 AND SHIFT LEFT = 1

| | P(DV) | P(EX) | P(31) | P(30) | P(29) | - - - | P(1) | P(0) | P(-1) | X |
|---|---|---|---|---|---|---|---|---|---|---|
| | | $-2^1$ | $2^0$ | $2^{-1}$ | $2^{-2}$ | | $2^{-30}$ | $2^{-31}$ | $2^{-32}$ | DIGIT VALUE |
| SIGN × SIGN | x | x | x | x | x | | x | 0 | N.A. | |
| SIGN × UNSIGN | x | x | x | x | x | | x | 0 | N.A. | |
| UNSIGN × UNSIGN | 0 | 0 | x | x | x | | x | x | N.A. | |

III) IF ONE OPERAND HAS X(DV) = 1

| | | | | | | |
|---|---|---|---|---|---|---|
| ALL CASES | 1 | @ | * | * | * | * | * | N.A. |

| x(DV) | x(EX) | x(N-1) | x(N-2) | x(N-3) | ... | x(1) | x(0) | X |
|---|---|---|---|---|---|---|---|---|
| | | $2^0$ | $2^{-1}$ | $2^{-2}$ | | $2^{-n+2}$ | $2^{-n+1}$ | DIGIT VALUE |
| 0 | 0 | 0 | x | x | | x | x | $1-2^{-n+1} \geq X \geq 0$ |
| 0 | 1 | 1 | x | x | | x | x | $-2^{-n+1} \geq X \geq -1$ |
| 0 | 0 | 1 | x | x | | x | x | $2-2^{-n+1} \geq X \geq 1$ |
| 0 | 1 | 0 | x | x | | x | x | $-(1+2^{-n+1}) \geq X \geq -2$ |
| 1 | 0 | x | x | x | | x | x | $X < -2$ |
| 1 | 1 | x | x | x | | x | x | $X \geq 2$ |

FIG. 7

DEVICE FOR MULTI-PRECISION AND BLOCK ARITHMETIC SUPPORT IN DIGITAL PROCESSORS

BACKGROUND OF THE INVENTION

1. Field of the Invention

This invention relates to arithmetic devices and more particularly to arithmetic devices used in support of digital signal processors.

2. Prior Art

In the prior art there exist arithmetic units which are utilized for digital processing; however, such prior art devices have substantial disadvantages as described herein below.

Firstly, prior art arithmetic units typically include a multiplier which is only capable of multiplying two signed numbers or two unsigned numbers. Such multiplying means are not capable of multiplying a signed number by an unsigned number.

Furthermore, the multiplier used in the prior art arithmetic units have a limited dynamic range. In particular, the dynamic range is typically from $-1$ to $+1$. As a result, the prior art arithmetic units are not capable of computing biquad IIR filter sections wherein the coefficient magnitudes are often greater than 1.

In addition, prior art arithmetic units are slow to indicate the existence of an overflow condition and typically perform all operations before indicating an overflow condition.

SUMMARY OF THE INVENTION

Accordingly, it is a general object of the present invention to provide a device for multi-precision and block arithmetic support in digital processors which overcomes the disadvantages of the prior art.

It is a particular object of the present invention to provide a device for multi-precision and block arithmetic support in digital processors which is capable of multiplying signed numbers, unsigned numbers and signed numbers with unsigned numbers.

It is yet another object of the present invention to provide a device for multi-precision and block arithmetic support in digital processors having a multiplier with a dynamic range of greater than $-1$ to $+1$.

It is still another object of the present invention to provide a device for multi-precision and block arithmetic support in digital processors which can indicate an overflow condition without having to perform the operations.

In keeping with the principles of the present invention, the objects of the invention are accomplished by a unique device for multi-precision and block arithmetic support in digital processors including a multiplier for multiplying two signed or unsigned binary numbers having a dynamic range greater than from $-1$ to $+1$, an arithmetic and logic unit for performing arithmetic and logic operations on at least one binary number, a barrel shifter for barrel shifting at least one binary number, at least one selectively operated shifter for shifting an output of the multiplier left or right and multiplexers for selecting and interconnecting the outputs and inputs of the multiplier, arithmetic and logic unit, barrel shifter and left and right shifters.

In addition to the above, to increase the usefulness and provide further advantages, the device of the present invention can be provided with accumulators for accumulating the outputs so that block floating point arithmetic operations may be formed and a peak and valley detector for determining the absolute peak and valley values and their addresses.

BRIEF DESCRIPTION OF THE DRAWINGS

The above mentioned features and objects of the present invention will become more apparent with reference to the following description taken in conjunction with the drawings wherein the like reference numerals denote like elements and in which:

FIGS. 3 and 4 are tables indicating the inputs to the multiplier of the present invention;

FIGS. 5 and 6 are tables indicating the outputs of the multiplier of the present invention;

FIG. 7 is a table indicating the inputs to the arithmetic and logic unit and barrel shifters and the range of the dynamic overflow X for various inputs.

DETAILED DESCRIPTION OF THE INVENTION

Figure 1:
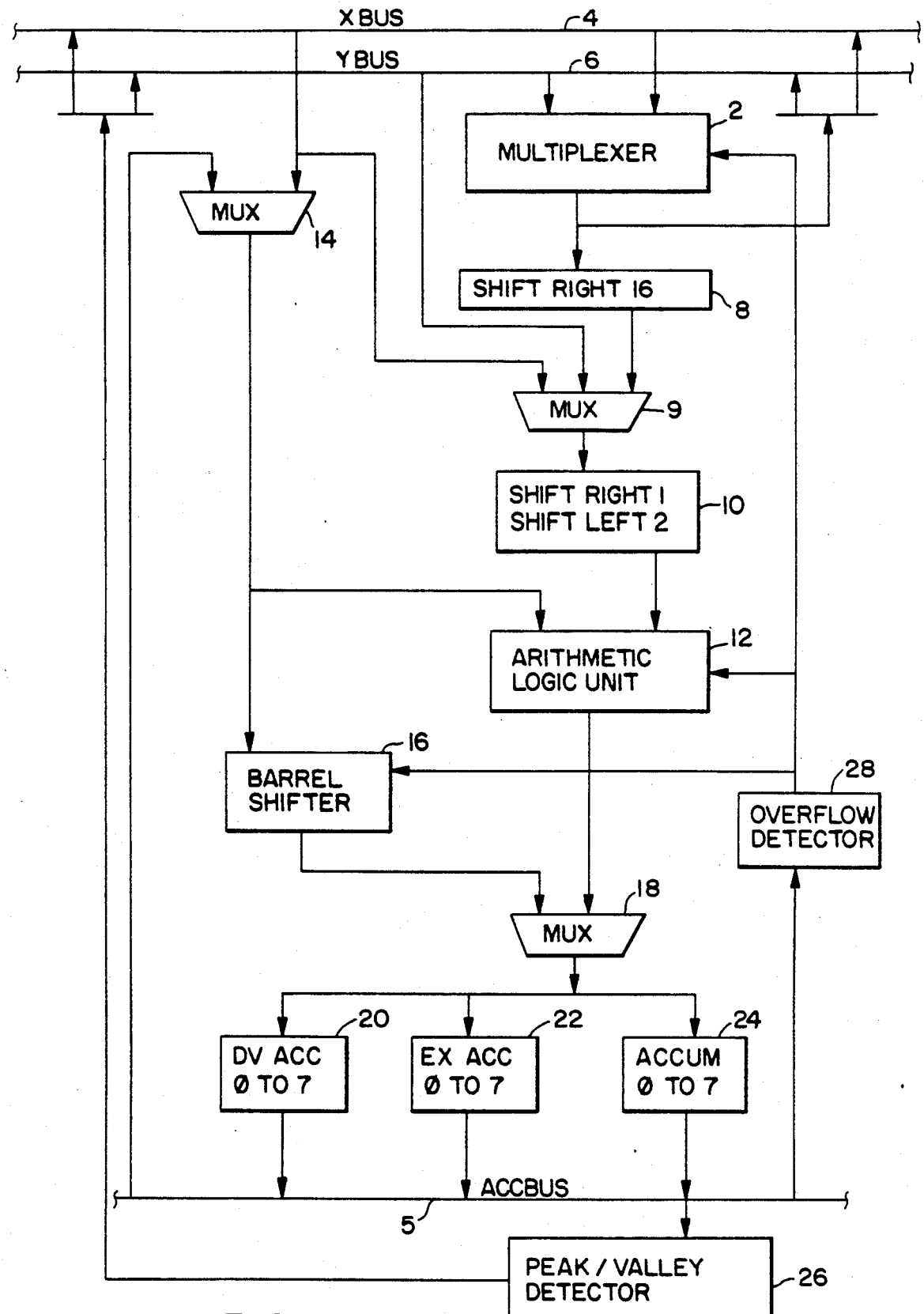
FIG. 1 is a simplified block diagram of a device for multi-precision and block arithmetic support for a digital processor in accordance with the teachings of the present invention.

Referring to FIG. 1, shown therein is a device for multi-precision and block arithmetic support in digital processors in accordance with the teachings of the present invention. The device includes a multiplier 2 whose inputs are connected to X bus 4 and Y bus 6. X bus 4 and Y bus 6 are buses for carrying data and typically the word length for the data on these buses is 16 bits to these 16 bit words is added an additional two bits, an extension bit EX and a dynamic overflow bit DV, for a total of 34 bits. The multiplier 2 is of a unique construction, as will be described in more detailed herein below, and is capable of multiplying together two signed numbers, two unsigned numbers or one signed number and one unsigned number and is a 17 bit by 17 bit multiplier. In addition, the dynamic range of the multiplier is greater than from $-1$ to $+1$ and is typically from $-2$ to $+1.99$.

The output of the multiplier 2 is supplied to a shift right 16 shifter 8 and to the X bus 4 and Y bus 6 using appropriate gating. The shifter 8 is for the purpose of shifting the output of the multiplier 2 right sixteen places. The output of the shifter 8 is provided to an input of a multiplexer 9 together with the X bus 4 and Y bus 6. The output of the multiplexer 9 is the input of a shift right one or shift left two shifter 10. The shifter 10 is for the purpose of controllably shifting the output of the multiplexer 9 right one place, left one or two places or not at all and therefore provides a range of three places. The output of the shifter 10 is supplied to an arithmetic and logic unit 12. The X bus 4 is further supplied to the inputs of a multiplexer 14 which is capable of selecting between its inputs and connecting them to its output. The output of the multiplexer 14 is supplied to an input of the arithmetic and logic unit 12 and to a barrel shifter 16. The arithmetic and logic unit 12 can therefore perform arithmetic and logic operations on either or both of the outputs of the shifter 10 or multiplexer 14. The barrel shifter 16 is for the purpose of performing barrel shifting operations on its input.

The outputs of the barrel shifter 16 and the arithmetic and logic unit 12 are provided to a multiplexer 18 which selects between its inputs and couples one of them through to its output. The output of the multiplexer 18 is coupled to a plurality of accumulators. The most significant bit or in this case, the 33rd bit, is a accumulated as a dynamic overflow bit DV in the DV accumulator 20. The DV accumulator 20 actually comprises eight accumulators 0 through 7 which are each capable of separately accumulating a most significant bit for each output word or number from the multiplexer 18. The 32nd bit or extension bit EX is accumulated in the EX accumulator 22. Again, the EX accumulator 22 comprises eight accumulators 0 through 7 for accumulating the extension or 32nd bit of each word or number outputted from the multiplexer 18. The remaining bits 0 through 31 which represent the output number itself are accumulated in the accumulator 24. Again, the accumulator 24 comprises eight accumulators 0 through 7. It should be apparent that for some applications, the number of bits for the accumulators may be from 32, 33 or 34 bits from accumulators 20 through 24.

The output of the accumulator 24 is supplied to a peak and valley detector 26 through 34 bit accumulator bus 5 and in the peak and valley detector 26 the maximum and minimum values of the output of the accumulator 24 which is indicative of the output of the device is determined. The peak and valley detector 26 could be a peak and valley detector such as that described in U.S. patent application Ser. No. 311,161 which was filed on Feb. 15, 1989 and is for a peak and valley detector. In addition, the outputs of the EX and DV accumulators 22 and 20 are supplied to the peak and valley detector 26 via accumulator bus 5. As a result, the peak and valley detector 26 operates on the entire 34 bits. The output of the peak and valley detector 26 is selectively supplied to the X bus 4 and/or Y bus 6.

The outputs of the DV accumulator 20, EX accumulator 22 and the accumulator 24 are respectively applied to the input of the multiplexer 14 and an overflow detector 28 through accumulator bus 5. The output of the overflow detector 28 is supplied to the barrel shifter 16, arithmetic unit 12 and multiplier 2 and in the event that the accumulated output has an overflow and the data on the accumulator bus 5 is supplied to the barrel shifter 16, arithmetic unit 12 and multiplier 2, an overflow will be indicated and the barrel shifting, arithmetic and logic and/or multiplying operations will not occur and a value equal to the maximum positive or negative values of the dynamic range will be set. The output of the overflow detector 28 may be also used as a control input for the shifter 10. The overflow detector 28 detects the existence of an overflow condition. It does this by looking at the most significant or 33rd bit (DV) from the DV accumulator 20, the 32nd or extension bit from the EX accumulator 22 and the 31st bit (EX) from the accumulator 24, all of which it receives via accumulator bus 5. Based on an examination an overflow condition is detected and the examination of the 31st through 33rd bits and generation of a one as an overflow bit (OVB) is given in the following table.

| 33rd | 32nd | 31st | OVB |
|------|------|------|-----|
| 1    | X    | X    | 1   |
| 0    | 0    | 0    | 0   |
| X    | 0    | 1    | 1   |
| X    | 1    | 0    | 1   |

-continued

| 33rd | 32nd | 31st | OVB |
|------|------|------|-----|
| X    | 1    | 1    | 0   |

In the above table, X indicates that this bit may be either 1 or 0.

The outputs of the DV accumulator 20 and the extension accumulator 22 are also supplied to the multiplier 22 for use as extension bits EX and dynamic overflow bits DV when the outputs of the accumulators 20, 22 and 24 are on the X and Y buses 4 and 6.

In the above described device, the word length handled by the shifters 8 and 10, arithmetic and logic unit 12 and barrel shifter 16 and the output of the multiplier 2 is 34 bits. As described above in conjunction with the multiplier 2, the 0 through 31st bits comprise the number which itself may be divided into two separate words of a length bits 0 through 15 and bits 16 through 31, an extension bit corresponding to the 32nd bit and a dynamic overflow bit DV which is the most significant or 33rd bit.

It should be further apparent of ordinary skill in the art that the operation of the units which make up of the device of the present invention are under program control and the flow of data through the device of the present invention is selectively controlled by the multiplexers 14 and 18 and other logic gates, not shown, under program control so that the operations upon the data from the X bus 4 and Y bus 6 may be from the simplest, a mere multiplication, to the most complex which would mean that the data from the X bus 4 and Y bus 6 would be subjected to multiplication, shifting, barrel shifting and arithmetic and logic operations before being accumulated in the accumulators 20 through 24 as outputs.

Figure 2:
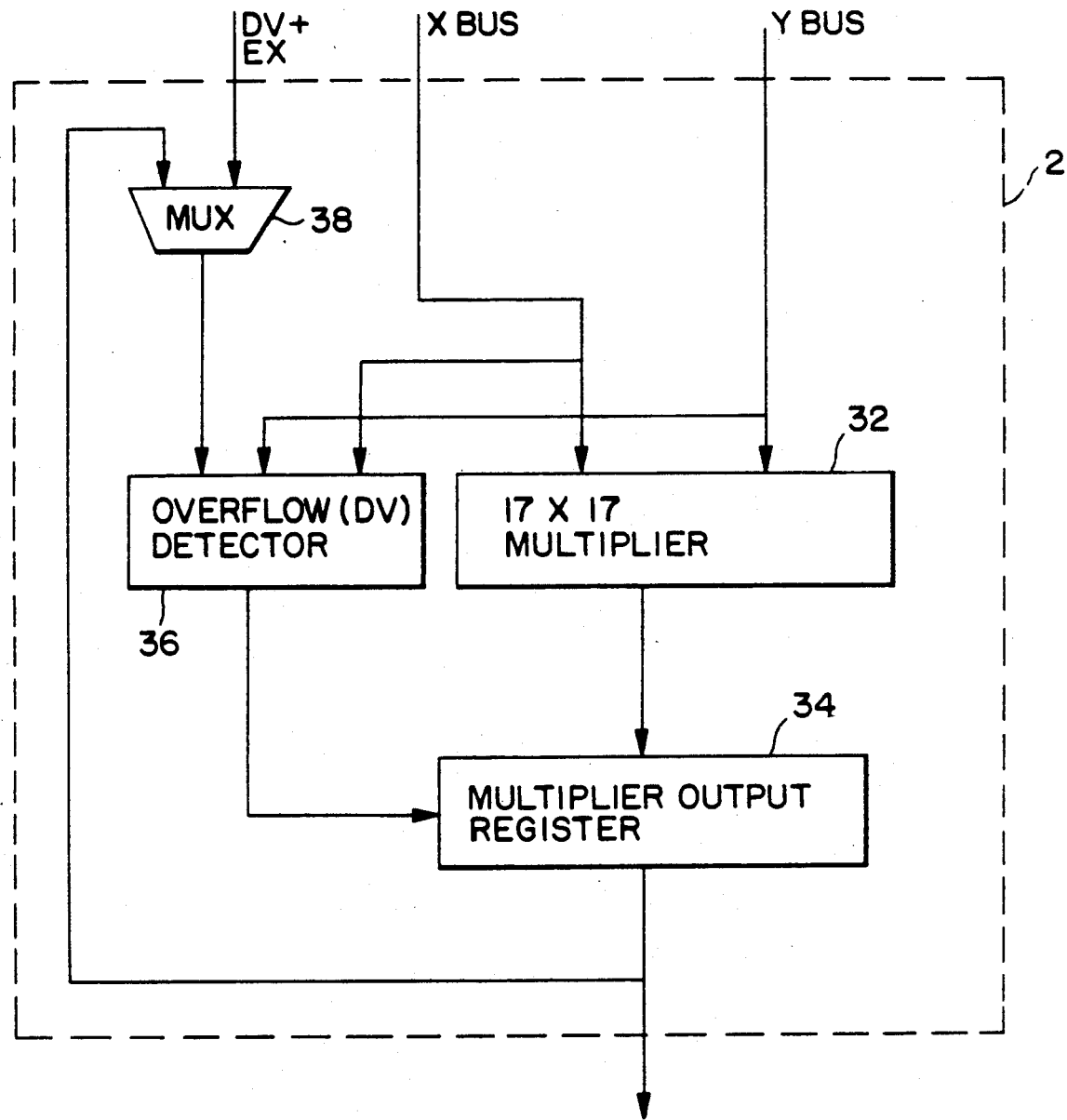
FIG. 2 is a simplified block diagram of a multiplier in accordance with the teachings of the present invention.

Referring to FIG. 2 shown therein is a simplified block diagram of a multiplier 2 in accordance with the teachings of the present invention. The multiplier 2 shown in FIG. 2 includes a 17 bit by 17 bit multiplier 32 and to the multiplier 32 is supplied the data from the X bus 4 and Y bus 6 to which is added the extension bit EX and the dynamic overflow bit DV. In other words, a full 34 bits are operated upon by the multiplier 32.

The output of the 17 bit by 17 bit multiplier 32 is applied to a multiplier output register 34. The multiplier output register 34 receives and holds the output of the multiplier 32 or is set to the maximum positive or negative values of the dynamic range in response to the detection of a 1 as the DV bit by the overflow detector 36. In this way if the calculation of the multiplier 32 would be an overflow, the overflow detector will automatically set the multiplier output register 34 to the maximum positive or negative value of the dynamic range upon sensing that the DV bit is a 1 without the multiplier 32 actually performing the multiplication. In addition, the extension bit EX and dynamic overflow bit DV from the accumulators 20 and 22 together with the EX and DV bits (the 32nd and 33rd bits) from the output word from the multiplier output register 34 are applied to the multiplexer 38. The inputs of the multiplexer 38 may be selectively applied to the overflow detector 36.

In operation, it is the addition of the extension EX bit and the dynamic overflow bit DV which extends the range of the multiplier 2. In addition, if the output of the multiplier 2 is selectively applied to the X bus 4 and Y bus 6, then the corresponding EX and DV bits from register 34 are supplied to the overflow detector 36; alternately, if the output of the peak and valley detector 26 which corresponds to the outputs stored in accumulator 24 is selectively applied to the X bus 4 and Y bus 6, then the corresponding bits from the DV and EX accumulator 20 and 22 are supplied to the overflow detector 36. Otherwise, zeros are provided to the overflow detector as the dynamic overflow bit DV and the extension bit EX. Furthermore, the inputs and output and the multiplier 2 shown in the tables of FIGS. 3 through 6 demonstrate the operation thereof. In these tables, X indicates that the value can be either a 1 or a 0 and X is the range of values for the particular inputs illustrated. From the tables it should be apparent that the dynamic range is from $-2$ to $+1.99$.

The arithmetic and logic unit 12 is of the general prior art type in that it includes multiplexers, shifters, adders, logic processors, decoders and generators; however, the arithmetic and logic unit 12 is different from prior art units in that it is designed to handle 34 bit words of the type described above.

As to the barrel shifter 16, it too is generally of the existing type except that it is designed to handle 34 bit words of the type described above and includes further circuitry as is described herein below.

Referring to FIG. 7, shown therein are the inputs to the arithmetic and logic unit 12 and the barrel shifter 16 to illustrate the operation thereof and to indicate the range of the digit value X for the particular illustrated inputs. From the table in FIG. 7 it should be apparent that the dynamic range of the digit value X is from $-2$ to $+1.99$.

Figure 8:
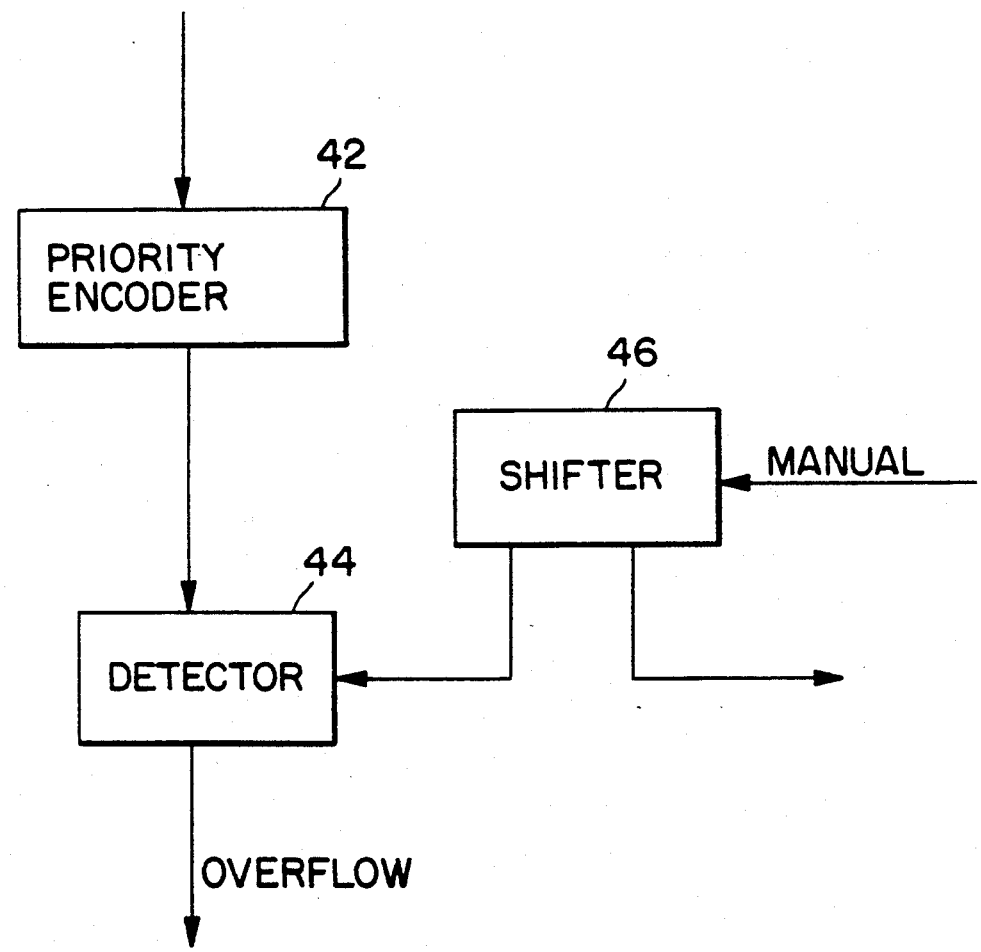
FIG. 8 is a simplified block diagram illustrating a portion of the barrel shifter.

Referring to FIG. 8, shown therein is a portion of the barrel shifter 16. The portion of the circuitry of the barrel shifter 16 shown in FIG. 8 includes a priority encoder 42 to which is applied the 34 bits of input data. The priority encoder 42 detects the number of leading 1s or 0s and outputs a number which is indicative of the number of leading 1s or 0s. This number is applied to the detector 44. In addition, the number of shifts to be performed are supplied to the detector 44 by the shifter 46 and if the number of shifts from the shifter 46 is greater than the number of leading 1s or 0s detected by the priority encoder 42, the detector 44 outputs an overflow. Again, in this way the existence of an overflow condition can be quickly determined without performing the barrel shifter operations and thus the speed of operation of the entire device can be increased without affecting the accuracy.

In addition to the above, in the portion of the circuitry shown in FIG. 8, the shifter 46 normally contains a shift value which is a default value; however, the number of shifts may be manually and programmably set to some other value in accordance with the program requirements.

It should be apparent that while the above description has been made in terms of 16, 18, 32 and 34 bits, the present invention could be further applied to word lengths of 8 bits and 32 bits on the data buses.

It should further be apparent to those skilled in the art that the above described embodiment is merely illustrative of but one of many possible specific embodiments which represent the applications and principles of the present invention. Numerous and various other arrangement could be readily devised by those skilled in the art without departing from the spirit and the scope of the invention.

We claim:

1. A device for multi-precision and block arithmetic support in digital processors comprising:
   a multiplying means for multiplying two signed, two unsigned or signed and unsigned numbers and, said multiplying means comprising a 17 bit by 17 bit multiplier having an input and output dynamic range from $-2$ to $+1.99$ and further including a means for detecting the existence of an overflow condition and for generating an overflow indication before multiplication operations are performed by the 17 bit by 17 bit multiplier;
   an arithmetic and logic means for performing arithmetic and logic operations on at least one binary number;
   a barrel shifter means for barrel shifting at least one binary number;
   a means for selectively shifting an output of said multiplier means; and
   controllable means coupled to the outputs and inputs of said multiplying means, arithmetic and logic means, barrel shifter means and shifting means for selectively interconnecting the outputs and inputs of said multiplying means, arithmetic and logic means, barrel shifter means and shifting means.

2. A device according to claim 1, further comprising a plurality of accumulators for accumulating a plurality of output words.

3. A device according to claim 2, further comprising a peak and valley detector for detecting the maximum and minimum values of the output of the device.

4. A device for multi-precision and block arithmetic support in digital processors comprising:
   an input bus;
   a multiplying means for multiplying two signed, two unsigned or signed and unsigned numbers and having an input and an output dynamic range greater than $-1$ to $+1$;
   a arithmetic and logic means for performing arithmetic and logic operations on at least one binary number;
   a barrel shifter means for barrel shifting at least one binary number;
   a means for selectively shifting an output of said multiplier means;
   an accumulator means for accumulating output words;
   a first multiplexer means having an input coupled to an output of said shifting means and said input bus and an output coupled to an input of said arithmetic and logic means;
   a second multiplexer means having an input coupled to an output of said arithmetic and logic means and said barrel shifter and an output coupled to an input of said accumulator means;
   a third multiplexer means having an input coupled to said output bus and said input bus and an output coupled to an input of said barrel shifter and another input of said arithmetic and logic means; and
   a controllable means for selectively controlling said first, second and third multiplexing means to selectively interconnect said multiplying means, arithmetic and logic means, barrel shifter and shifting means.

5. A device according to claim 4, wherein said multiplying means is a 17 bit by 17 bit multiplier and the dynamic range of the input and output of the 17 bit by 17 bit multiplier is from $-2$ to $+1.99$.

6. A device according to claim 5, wherein said multiplying means further includes a means for detecting the existence of an overflow condition and for generating an overflow condition before multiplication operations are performed by said 17 bit by 17 bit multiplier.

7. A device according to claim 4, further comprising a peak and valley detector for detecting the maximum and minimum values of the output of the device.

* * * * *